Figure 1:
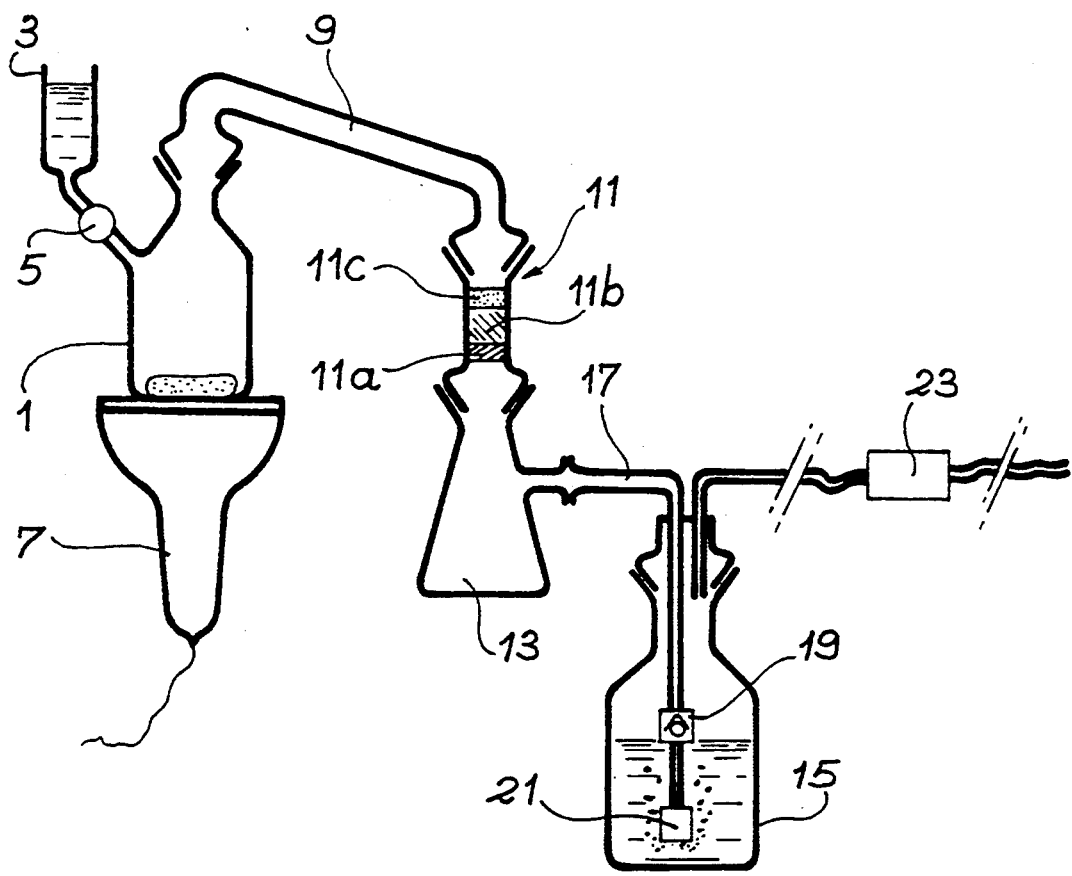

United States Patent [19]

Foos et al.

[11] Patent Number: 5,417,942
[45] Date of Patent: May 23, 1995

[54] PROCESS FOR TRAPPING GASEOUS RUTHENIUM ON POLYVINYL PYRIDINE, MORE PARTICULARLY USABLE FOR RECOVERING RADIOACTIVE RUTHENIUM FROM IRRADIATED NUCLEAR FUELS

[75] Inventors: Jacques Foos, Orsay; Marc Lemaire, Villeurbanne; Alain Guy, Pontcarré; Micheline Draye, Lyons; Rodolph Chomel, Camaret sur Aigues; André Deloge, Bagnols S/Ceze; Pierre Doutreluingne, Cherbourg, all of France

[73] Assignee: Compagnie Generale des Matieres Nucleaires, France

[21] Appl. No.: 24,933

[22] Filed: Mar. 2, 1993

[30] Foreign Application Priority Data

Mar. 3, 1992 [FR] France ................. 92 02514

[51] Int. Cl.$^6$ ............................................. C01G 55/00
[52] U.S. Cl. ............................................. 423/2; 423/22
[58] Field of Search ...................... 423/22, 2; 252/630

[56] References Cited

U.S. PATENT DOCUMENTS 5,114,473  5/1992  Abatjoglou et al. ............. 423/22
5,131,943  7/1992  Allison et al. ................... 423/22

*Primary Examiner*—Donald P. Walsh
*Assistant Examiner*—Frederick H. Voss
*Attorney, Agent, or Firm*—Pearne, Gordon, McCoy & Granger

[57] ABSTRACT

The invention relates to a process fop trapping gaseous ruthenium on polyvinyl pyridine, more particularly usable for recovering radioactive ruthenium from irradiated nuclear fuels.

This process consists of contacting a gas containing ruthenium in gaseous form with an adsorbent (11b) constituted by a vinyl pyridine polymer or copolymer for fixing the ruthenium to the latter. The gas can be constituted by yapours from a concentrate of fission products containing ruthenium, which has been heated (at 31) in the presence of an oxidizing agent for volatilizing the ruthenium.

10 Claims, 1 Drawing Sheet

U.S. Patent　　　　　May 23, 1995　　　　　5,417,942

PROCESS FOR TRAPPING GASEOUS RUTHENIUM ON POLYVINYL PYRIDINE, MORE PARTICULARLY USABLE FOR RECOVERING RADIOACTIVE RUTHENIUM FROM IRRADIATED NUCLEAR FUELS

The object of the present invention is a process for the trapping and fixing of ruthenium in gaseous form and in particular ruthenium tetroxide, present in a gaseous flow of an installation for the reprocessing of irradiated nuclear fuels. The irradiation of nuclear fuels in power reactors leads to the production of numerous fission products, whose atomic masses are 70 to 160. These fission products generally appear in the effluents produced at the end of the cycle of the fuel. They in particular include metals of the platinum group such as palladium, rhodium and ruthenium, which are valorizable elements, particularly rhodium due to its use in catalytic converters for cars. Unfortunately, the known processes for the separation of these metals and such as those described by HAZELTON et al in PNL-5758-UC-70-1986, led to the recovery of the rhodium and ruthenium together, which does not make it possible to valorize the rhodium due to the high radioactivity of ruthenium. In addition, ruthenium 106 is one of the main elements contributing to the radioactivity of effluents.

It would therefore be advantageous to have a process for effectively separating the ruthenium from effluents, so as to reduce the activity thereof.

A known ruthenium separation process consists of volatilizing the latter in ruthenium tetroxide form by the oxidation of the ruthenium present in nitric solutions using potassium periodate and as is described by BUSH in Platinum Metals Rev, 1991, 35, 4, pp. 202–208. However, this gaseous ruthenium must then be recovered, which causes problems which have not been solved up to now.

The present invention specifically relates to a process for the trapping and fixing of ruthenium in gaseous form, which makes it possible to recover more than 99% of the ruthenium.

According to the invention, the process for the recovery of the ruthenium in gaseous form present in a gas consists of contacting the gas with an adsorbent incorporating a vinyl pyridine polymer or copolymer and separating the gas from the adsorbent on which the ruthenium is fixed.

In this process, the choice of an adsorbent based on a vinyl pyridine polymer or copolymer makes it possible to trap the ruthenium in gaseous form with very high efficiency, because the ruthenium fixing yield exceeds 99%.

The gas containing the ruthenium in gaseous form can in particular be constituted by vapours formed during a volatilization treatment of the ruthenium performed on an aqueous effluent containing fission products from the reprocessing of irradiated nuclear fuels.

The invention also relates to a process for the separation of the radioactive ruthenium present in an aqueous effluent containing fission products from the reprocessing of irradiated nuclear fuels and which comprises:

a) heating the effluent to a temperature of 100° to 150° C. in the presence of an oxidizing agent in order to oxidize the ruthenium to volatile ruthenium tetroxide and b) recovering the thus volutilized ruthenium by contacting the gas containing the volutilized ruthenium with an adsorbent incorporating a vinyl pyridine polymer or copolymer and separating the gas from the adsorbent on which the ruthenium is fixed.

This procedure for recovering the ruthenium is particularly advantageous, because it can be used with numerous effluent types, even when the effluents have high salt contents and which can e.g. extend up to 100 g/l.

In stage a) of the volatilization of ruthenium in ruthenium tetroxide form, it is possible to use as the oxidizing agent alkali metal periodate or an alkali metal hypochlorite, such as sodium hypochlorite. In this stage, the effluent is generally heated to 100° to 150° C.

The adsorbents usable in the invention are in particular vinyl pyridine polymers such as poly-4-vinyl pyridine, crosslinked by appropriate crosslinking agents such as divinylbenzene and tetraethylene glycol dimethacrylate. It is also possible to use copolymers of vinyl-4-pyridine and divinylbenzene. Preference is given to the use of crosslinked polyvinyl-4-pyridine with a grain size of 15 to 60 mesh.

Thus, these crosslinked polyvinyl pyridines have very good ruthenium tetroxide adsorption properties. They also have the advantage of being stable at temperatures up to 260° C. under atmospheric pressure and of resisting reducing and oxidizing agents, so that they can be used in the presence of gases containing constituents such as nitrous vapours, oxygen, chlorine and water vapour. Moreover, they are not sensitive to irradiation, because no degradation is observed after irradiating for 8 hours 24 minutes using a cesium 137 source producing a dose rate of 2 Mrad/h, i.e. $1.05 \cdot 10^{16}$ MeV/kg.

The polyvinyl-4-pyridine used in preferred manner in the invention has a glass transition point of 151° C., which is not modified by irradiation. It can also be used in the form of a powder having an appropriate grain size.

For performing the process according to the invention, it is possible in particular to filter the gas containing the ruthenium in gaseous form through a powder of the adsorbent.

Preferably, working takes place at a temperature above ambient temperature, e.g. at a temperature of the gas on entering the filter of 53° to 63° C.

The adsorbent quantity used is dependent on the ruthenium quantity to be extracted and generally 0.07 to 0.5 g of polyvinyl pyridine are used for 1 mCi of Ru.

After fixing the ruthenium to the polyvinyl pyridine, it is possible to recover the latter in aqueous solution, if desired, by treating the polyvinyl pyridine in an appropriate aqueous solution for dissolving the ruthenium in it. For example, such a solution can be constituted by a sulphuric acid solution.

The invention is described in greater detail hereinafter relative to non-limitative embodiments and with reference to the attached drawings, wherein show:

FIG. 1 An installation for filtering a ruthenium-containing gas.

Figure 2:
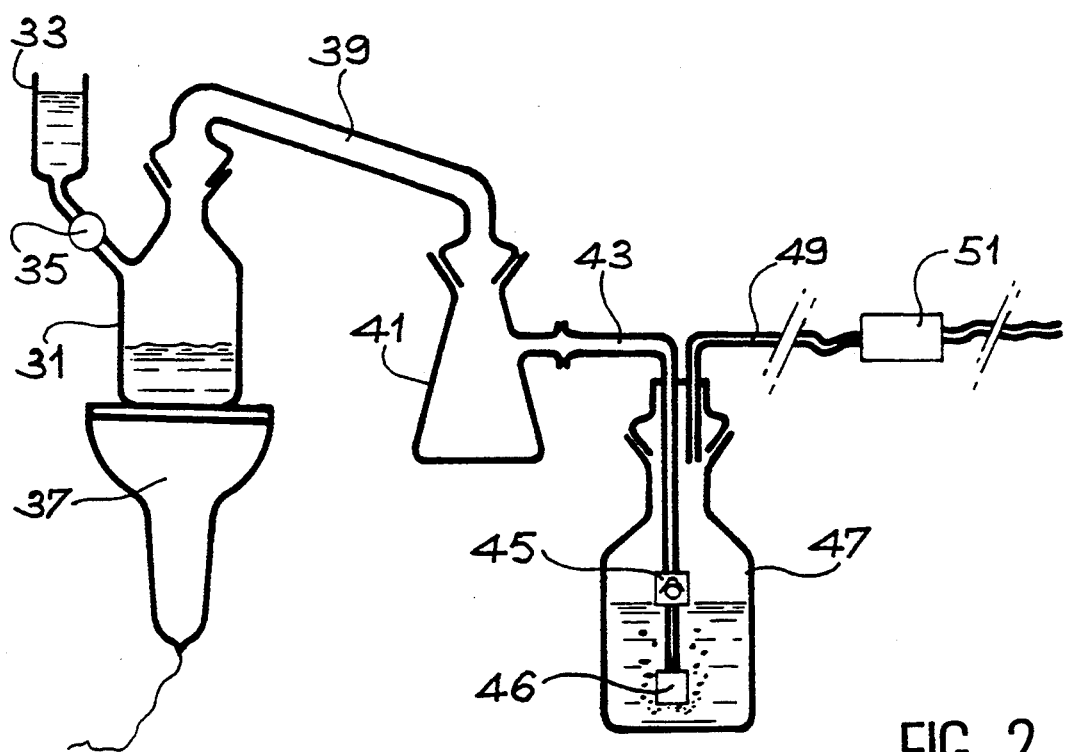

FIG. 2 An installation for the recovery in an aqueous solution of the ruthenium fixed to the adsorbent of the installation of FIG. 1.

FIG. 1 shows an installation making it possible to volatilize and then trap the ruthenium present in an aqueous solution of fission products.

This installation comprises a reactor (1) able to receive the solution of fission products, which is associated with an oxidizing agent distributor (3) by a pipe equipped with a valve (5). The reactor (1) can be heated by a heating means (7) and the vapours given off are supplied by a pipe (9) to a filter (11) which traps the ruthenium. The latter comprises a sintered product (11a), above which is placed the polyvinyl pyridine powder (11b), which is in turn covered by glass wool (11c).

The vapour filtered in the filter (11) is collected in a container (13) and then placed in a safety bottle (15) filled with a soda solution by means of a pipe (17) equipped with a non-return valve (19) and a gas diffuser (21) immersed in the soda solution. The gas bottle (1S) is linked with a venturi (23) making it possible to form a vacuum in the installation.

In order to make the said installation function, into the reactor (1) is introduced an aqueous solution of fission products constituted by a concentrate of fission products and this solution is heated to 100° to 150° C. using the heating means (7) after introducing into it sodium hypochlorite from the distributor (3).

Under these conditions, the ruthenium is oxidized by the sodium hypochlorite into ruthenium tetroxide, which is volatilized and brought by the pipe (9) together with the gas formed by the vapours from the solution incorporating $NO_2$, $Cl_2$, $H_2O$ and $O_2$, to the ruthenium filter (11). The temperature of the gas on entering the filter is 58°±5° C. After passing onto the filter, the gas is collected in the container (13) and then in the 1N soda-filled safety bottle (15), in which dissolves the ruthenium not fixed to the filter.

The ruthenium filter is formed by a vertically positioned, diameter 30 mm glass tube and having a sintered product (11a) on which are deposited 3 g of crosslinked 4-polyvinyl-pyridine having a grain size of 60 mesh and a crosslinking level of 2% and held by glass wool (11c). In the safety bottle (15) recovery takes place of the distillate and the ruthenium not fixed to the filter.

In order to determine the ruthenium quantity trapped on the filter, the polyvinyl pyridine powder of the filter (11) is dissolved in sulphuric acid using the installation shown in FIG. 2.

This installation comprises a reactor (31) associated with a sulphuric acid distributor (33) by a pipe equipped with a valve (35) and heating means (37). The vapours given off in the reactor (31) can be brought by a pipe (39) into a container (41) connected by a pipe (43) equipped with a non-return valve (45) and a diffuser (46) to a safety bottle (47) containing soda. This safety bottle is associated by a pipe (49) with a venturi (51) for producing a vacuum in the installation.

For recovering in solution the ruthenium fixed to the filter, the ruthenium-containing polyvinyl pyridine powder is introduced into the reactor (31) and to it is added concentrated sulphuric acid, followed by heating. During the heating operation, the polyvinyl pyridine is dissolved in the sulphuric acid at the same time as the ruthenium which is not volatile in this medium and the optionally volatilized ruthenium is recovered in the safety bottle (47), where it dissolves in the 1N soda.

This is followed by the analysis of the solutions obtained in the safety bottle (15) and the safety bottle (47) by gamma spectrometry in order to determine their ruthenium contents. This analysis method gives an accuracy of 2% for activities above 500 mCi/l, 5% between 1 and 500 mCi/l and 10% for activities below 1 mCi/l.

The following examples illustrate the results obtained during the processing of concentrates of fission products.

EXAMPLE 1

In this example, treatment took place in the manner described hereinbefore of a concentrate of fission products incorporating 49.8 Ci/l of cerium 144, 49.8 Ci/l of praseodymium 144, 35.7 Ci/l of ruthenium 106, 49.4 Ci/l of cesium 137 and 6.4 Ci/l of cesium 134, using 2 ml of concentrate (71.4 mCi of Ru 106) to which were added 60 ml of NaC1O and whilst heating to evaporation for 1 h.

At the end of the operation 33.268 mCi of Ru remained in the reactor and 38.07 mCi of Ru were collected on the filter (11) and 0.062 mCi of ruthenium in the safety bottle (15).

Thus, there was a ruthenium fixing yield of 99.8% and a ruthenium fixing rate of 12.7 mCi of Ru 106 per gramme of polyvinyl pyridine.

EXAMPLE 2

The same operating procedure as in example 1 was followed for treating 2 ml of concentrate of fission products incorporating 21 Ci/l of Ce 144, 21 Ci/l of Pr 144, 16.5 Ci/l of Ru 106 (33 mCi), 37.5 Ci/l of Cs 137, 4.4 Ci/l of Cs 134 and 0.7 Ci/l of Eu 154, carrying out heating for only 20 min. and using 18 ml of NaC1O. At the end of the operation there were 24 mCi of Ru in the reactor and 8.2 mCi of ruthenium were collected on the filter (11) and 0.0396 mCi of ruthenium in the safety bottle (15).

Thus, there was a ruthenium fixing yield of 99.5% and a Ru 106 fixing rate of 2.73 mCi/g of polyvinyl pyridine.

The results obtained in these examples demonstrate that the use of polyvinyl pyridine for trapping ruthenium in gaseous form makes it possible to achieve very high fixing deficiencies.

EXAMPLE 3

In this example the ruthenium-charged filter of example 1 was treated for the recovery of ruthenium fixed in an aqueous sulphuric solution and whilst using the installation of FIG. 2.

To this end introduction took place into the reactor (31) of the polyvinyl pyridine powder of the filter of example 1 with 30 ml of concentrated $H_2SO_4$, followed by heating to 150° C. Thus, PVC and ruthenium were dissolved in sulphuric acid, because Ru is not volatile in a sulphuric medium. The vapours produced are sucked into the safety bottle (47) filled with soda in order to collect there the ruthenium which might possibly be volatilized. At the end of the operation, the Ru content of the sulphuric solution and the soda solution is determined by gamma spectromerry.

The following results were obtained:

sulphuric solution of the reactor (31): 38 mCi of Ru 106, soda solution of the safety bottle (47): 0.0736 mCi of Ru 106.

The ruthenium recovery rate in the sulphuric solution is consequently very high, i.e. 99.8%.

We claim:

1. Process for the recovery of ruthenium in gaseous form present in a gas, characterized in that it consists of contacting the gas with an adsorbent incorporating vinyl pyridine polymer or copolymer and separating the gas from the adsorbent on which the ruthenium is fixed.

2. Process for the separation of radioactive ruthenium present in an aqueous effluent containing fission products resulting from the reprocessing of irradiated nuclear fuels, characterized in that it comprises
   a) heating the effluent to a temperature of 100° to 150° C. in the presence of an oxidizing agent for oxidizing the ruthenium to volatile ruthenium tetroxide and
   b) recovering the thus volatilized ruthenium by contacting a gas containing the volatilized ruthenium with an adsorbent incorporating a vinyl pyridine polymer or copolymer and separating the gas from the adsorbent on which the ruthenium is fixed.

3. Process according to claim 2, characterized in that the oxidizing agent is sodium hypochlorite.

4. Process according to either of the claims 1 and 2, characterized in that heating takes place in vacuo.

5. Process according to either of the claims 1 and 2, characterized in that the absorbent is constituted by crosslinked poly-4-vinyl pyridine.

6. Process according to either of the claims 1 and 2, characterized in that the contacting and separation of the gas with the adsorbent are carried out by filtering the gas through a powder of said adsorbent.

7. Process according to either of the claims 1 and 2, characterized in that the gas also comprises at least one constituent chosen from among nitrous vapours, oxygen, chlorine and water vapour.

8. Process according to either of the claims 1 and 2, characterized in that the contacting of the gas with the adsorbent takes place at a temperature of 53° to 63° C.

9. Process according to either of the claims 1 and 2, characterized in that the adsorbent is then treated to dissolve the ruthenium fixed to the adsorbent in an aqueous solution.

10. Process according to claim 9, characterized in that the aqueous solution is a sulphuric acid solution.

* * * * *